(12) United States Patent
Kim et al.

(10) Patent No.: US 11,760,908 B2
(45) Date of Patent: Sep. 19, 2023

(54) ADHESIVE FILM, OPTICAL MEMBER COMPRISING THE SAME, AND OPTICAL DISPLAY APPARATUS COMPRISING THE SAME

(71) Applicant: SAMSUNG SDI CO., LTD., Yongin-si (KR)

(72) Inventors: Ji Ho Kim, Suwon-si (KR); Ji Won Kang, Suwon-si (KR); Il Jin Kim, Suwon-si (KR); Kyoung Gon Park, Suwon-si (KR); Jin Young Lee, Suwon-si (KR); Jae Hyun Han, Suwon-si (KR); Se Mi Heo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/185,569

(22) Filed: Feb. 25, 2021

(65) Prior Publication Data
US 2021/0277292 A1    Sep. 9, 2021

(30) Foreign Application Priority Data

Mar. 3, 2020    (KR) .......................... 10-2020-0026636

(51) Int. Cl.
*C09J 133/08*    (2006.01)
*B32B 7/12*    (2006.01)
(Continued)

(52) U.S. Cl.
CPC ............... *C09J 133/08* (2013.01); *B32B 7/12* (2013.01); *B32B 27/08* (2013.01); *B32B 27/306* (2013.01);
(Continued)

(58) Field of Classification Search
None
See application file for complete search history.

(56) References Cited

U.S. PATENT DOCUMENTS

| 5,066,751 A | 11/1991 | Kotachi et al. |
| 2003/0236375 A1 | 12/2003 | SalamOne et al. |

(Continued)

FOREIGN PATENT DOCUMENTS

| CN | 101747860 A | 6/2010 |
| CN | 103055315 A | 4/2013 |

(Continued)

OTHER PUBLICATIONS

Aiqing, Z., "Pressure Sensitive Adhesives", 1st edition, Chemical Industry Press, (English abstract) (pp. 150-153, 161-162).

(Continued)

*Primary Examiner* — Ramsey Zacharia
(74) *Attorney, Agent, or Firm* — Lewis Roca Rothgerber Christie LLP (57) ABSTRACT

An adhesive film formed of an adhesive composition including a hydroxyl group-containing (meth)acrylic copolymer and a silicone-containing (meth)acrylic compound, the adhesive film having a peel strength ratio of about 50% or more, as calculated by Equation 1, an optical member including the same, and an optical display apparatus including the same are disclosed.

19 Claims, 3 Drawing Sheets

(51) Int. Cl.
- *B32B 27/08* (2006.01)
- *B32B 27/30* (2006.01)
- *B32B 27/36* (2006.01)
- *C09J 4/00* (2006.01)
- *C08F 220/18* (2006.01)
- *C09J 7/30* (2018.01)
- *C09J 7/10* (2018.01)
- *C09J 11/08* (2006.01)
- *C09J 133/06* (2006.01)
- *G02B 1/10* (2015.01)
- *C09J 7/38* (2018.01)
- *C09J 4/06* (2006.01)
- *C09J 7/22* (2018.01)
- *C09J 11/06* (2006.01)
- *C09J 133/04* (2006.01)

(52) U.S. Cl.
CPC ........ *B32B 27/36* (2013.01); *B32B 2307/402* (2013.01); *B32B 2457/206* (2013.01)

(56) References Cited

U.S. PATENT DOCUMENTS

| | | | |
|---|---|---|---|
| 2006/0057222 | A1 | 3/2006 | Linhardt et al. |
| 2009/0075008 | A1 | 3/2009 | Hwang et al. |
| 2012/0125431 | A1 | 5/2012 | Ozum et al. |
| 2014/0194572 | A1 | 7/2014 | Matsumoto et al. |
| 2015/0056757 | A1 | 2/2015 | Liu et al. |
| 2015/0252125 | A1 | 9/2015 | Moro et al. |
| 2015/0280151 | A1 | 10/2015 | Nam et al. |
| 2017/0253769 | A1* | 9/2017 | Cho .................... C09J 7/10 |
| 2018/0342674 | A1 | 11/2018 | Nam et al. |
| 2019/0071589 | A1 | 3/2019 | Ieda et al. |
| 2020/0347269 | A1* | 11/2020 | Kim .................... C09J 7/401 |
| 2021/0147721 | A1 | 5/2021 | Kang et al. |
| 2021/0277292 | A1 | 9/2021 | Kim et al. |
| 2021/0284877 | A1 | 9/2021 | Han et al. |
| 2021/0371713 | A1 | 12/2021 | Nam et al. |

FOREIGN PATENT DOCUMENTS

| | | | |
|---|---|---|---|
| CN | 103309162 A | | 9/2013 |
| CN | 104379621 A | | 2/2015 |
| CN | 104903976 A | | 9/2015 |
| CN | 105567137 A | | 5/2016 |
| CN | 107163865 A | | 9/2017 |
| CN | 107304338 A | | 10/2017 |
| CN | 110484170 A | | 11/2019 |
| CN | 111019566 A | | 4/2020 |
| DE | 102009003223 A1 | | 12/2010 |
| JP | 2-258815 A | | 10/1990 |
| JP | 2007-314758 A | | 12/2007 |
| JP | 2008-210845 A | | 9/2008 |
| JP | 2012-158633 A | | 8/2012 |
| JP | 2013-076097 A | | 4/2013 |
| JP | 2013-213206 A | | 10/2013 |
| JP | 2014-189716 A | | 10/2014 |
| JP | 2015-189977 A | | 11/2015 |
| JP | 2016-14827 A | | 1/2016 |
| JP | 2019-104193 A | | 6/2019 |
| KR | 10-2007-0055363 A | | 5/2007 |
| KR | 10-2011-0020133 A | | 3/2011 |
| KR | 10-2011-0071039 A | | 6/2011 |
| KR | 10-2013-0078599 A | | 7/2013 |
| KR | 10-2014-0034882 A | | 3/2014 |
| KR | 10-2015-0059127 A | | 5/2015 |
| KR | 10-2015-0105897 A | | 9/2015 |
| KR | 10-2015-0114400 A | | 10/2015 |
| KR | 10-2016-0004928 A | | 1/2016 |
| KR | 10-2017-0114642 A | | 10/2017 |
| KR | 10-2019-0028032 | | 3/2019 |
| KR | 10-2019-0037137 A | | 4/2019 |
| KR | 10-2020-0006873 A | | 1/2020 |
| TW | 202016250 A | | 5/2020 |
| WO | WO 2018-078952 A1 | | 5/2018 |
| WO | WO-2019045479 A1 * | | 3/2019 ................ C08F 2/50 |

OTHER PUBLICATIONS

Chinese First Office Action, and partial machine English translation, dated Aug. 16, 2019 in the corresponding Chinese Patent Application No. 201680061108.9, 12 pages.
Japanese Notice of Reasons for Refusal, for Patent Application No. 2018-518429, dated Apr. 28, 2020, 3 pages.
Kawahara et al, JP 2012-158633 Machine Translation, Aug. 23, 2012 (Year: 2012).
Lee et al, KR 1020150059127 Machine Translation, May 29, 2015 (Year: 2015).
Nakajima et al, CN 104379621 Machine Translation, Feb. 25, 2015 (Year: 2015).
Nakamura et al, JP 2014-189716 Machine Translation, Jun. 10, 2014 (Year: 2014).
"Silicones for Resin Modification", ShinEtsu, Oct. 2010, pp. 1-12.
U.S. Final Office Action from U.S. Appl. No. 16/642,831, dated Nov. 14, 2022, 18 pages.
U.S. Notice of Allowance from U.S. Appl. No. 15/769,496, dated Nov. 8, 2022, 10 pages.
U.S. Office Action from U.S. Appl. No. 15/769,496, dated Feb. 24, 2021, 3 pages.
U.S. Office Action from U.S. Appl. No. 15/769,496, dated May 15, 2020, 16 pages.
U.S. Office Action from U.S. Appl. No. 15/769,496, dated May 2, 2022, 21 pages.
U.S. Final Office Action from U.S. Appl. No. 15/769,496, dated Nov. 13, 2020, 13 pages.
U.S. Office Action from U.S. Appl. No. 16/642,831, dated Aug. 1, 2022, 16 pages.
U.S. Notice of Allowance from U.S. Appl. No. 16/642,831, dated Feb. 1, 2023, 10 pages.
Chinese Office Action, with English translation, dated Jun. 2, 2021, issued in Chinese Patent Application No. 201880055979.9 (24 pages).
U.S. Office Action dated Mar. 16, 2023, issued in U.S. Appl. No. 17/332,566 (27 pages).
U.S. Final Office Action dated Jul. 20, 2023, issued in U.S. Appl. No. 17/332,566 (24 pages).

* cited by examiner

ADHESIVE FILM, OPTICAL MEMBER COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2020-0026636, filed on Mar. 3, 2020 in the Korean Intellectual Property Office, the entire disclosure of which is incorporated herein by reference.

BACKGROUND

1. Field

Aspects of embodiments of the present invention relate to an adhesive film, an optical member including the same, and an optical display apparatus including the same.

2. Description of the Related Art

An optical display apparatus includes display elements including a window film, a conductive film, an organic light emitting diode, and the like. In the optical display apparatus, various display elements are attached to each other via optically clear adhesives (OCAs). Recently, a flexible optical display has been developed. With the development of the flexible optical display, there is increasing need for improvement in flexural reliability of a transparent adhesive film.

Among the display elements, the window film disposed at the outermost side is vulnerable to external impact. Accordingly, a stack of a protective film for protecting the window film and a transparent adhesive film is attached to the window film. To prevent attachment failure or intrusion of bubbles or foreign matter upon attaching the stack to the window film, there is a need for rework operation in which the stack is attached to the window film after detachment of the stack therefrom. In recent years, with increasing demand for miniaturization, sophistication, and the like, such rework operation is repeatedly required.

In general, rework operation is performed at a high temperature of, for example, 60° C. to 80° C. However, when the adhesive film is cooled to room temperature after rework operation performed by heating the adhesive film from room temperature to high temperature, it is difficult to recover peel strength of the adhesive film to initial peel strength at initial room temperature after rework operation. Therefore, there is a need for an adhesive film that exhibits sufficient peel strength at room temperature while allowing reversible variation in peel strength even after repeated temperature variation between room temperature and high temperature.

The background technique of the present invention is disclosed in Korean Patent Laid-open Publication No. 10-2007-0055363.

SUMMARY

According to an aspect of embodiments of the present invention, an adhesive film that exhibits sufficient peel strength at room temperature to provide a good effect in protection of an adherend is provided.

According to another aspect of embodiments of the present invention, an adhesive film that has lower peel strength at high temperature than at room temperature, thereby improving reworkability, is provided.

According to another aspect of embodiments of the present invention, an adhesive film that can minimize or reduce a reduction in peel strength, as compared with peel strength at initial room temperature, even after repeated temperature variation in the sequence of room temperature, high temperature, room temperature, and high temperature is provided.

According to another aspect of embodiments of the present invention, an adhesive film that exhibits good reworkability even after repeated temperature variation is provided.

According to one or more embodiments of the present invention, an adhesive film is formed of an adhesive composition including a hydroxyl group-containing (meth)acrylic copolymer and a silicone-containing (meth)acrylic compound, the adhesive film having a peel strength ratio of about 50% or more, as calculated by the following Equation 1:

$$\text{Peel strength ratio} = [P3/P1] \times 100,$$

where P1 is peel strength of the adhesive film at 25° C. (unit: gf/inch), and P3 is peel strength of the adhesive film at 25° C. (unit: gf/inch), as measured after 10 cycles of peel strength testing, in which each cycle refers to an operation of leaving the adhesive film at 25° C. for 30 minutes, heating the adhesive film from 25° C. to 80° C. at a heating rate of 5° C./min, leaving the adhesive film at 80° C. for 24 hours, and cooling the adhesive film from 80° C. to 25° C. at a cooling rate of 5° C./min.

The adhesive film may have a P3 value of about 560 gf/inch or more in Equation 1.

The adhesive film may have a P1 value of about 400 gf/inch or more in Equation 1.

The adhesive film may have a modulus of about 250 kPa or less at −20° C.

The hydroxyl group-containing (meth)acrylic copolymer may include a copolymer of a monomer mixture including a hydroxyl group-containing (meth)acrylate, an alkyl group-containing (meth)acrylate, and a hetero-alicyclic group-containing monomer.

The monomer mixture may include about 5 wt % to about 30 wt % of the hydroxyl group-containing (meth)acrylate, about 50 wt % to about 90 wt % of the alkyl group-containing (meth)acrylate, and about 1 wt % to about 20 wt % of the hetero-alicyclic group-containing monomer.

The hetero-alicyclic group-containing monomer may include N-(meth)acryloylmorpholine.

The silicone-containing (meth)acrylic compound may be present in an amount of about 0.1 parts by weight to about 5 parts by weight relative to 100 parts by weight of the hydroxyl group-containing (meth)acrylic copolymer or a monomer mixture for the hydroxyl group-containing (meth) acrylic copolymer.

The silicone-containing (meth)acrylic compound may include at least one selected from among an organopolysiloxane having a (meth)acrylate group at one end thereof and an organopolysiloxane having (meth)acrylate groups at both ends thereof.

The adhesive composition may further include a crosslinking agent and a photoinitiator.

The crosslinking agent may include a photocurable polyfunctional (meth)acrylate.

The adhesive composition may further include organic nanoparticles.

The organic nanoparticles may include core-shell nanoparticles satisfying the following Equation 2:

$$Tg(c) < Tg(s),$$

where Tg(c) is a glass transition temperature of the core (unit: °C.), and Tg(s) is a glass transition temperature of the shell (unit: °C.).

The organic nanoparticles may be present in an amount of about 0.1 wt % to about 10 wt % based on the total weight of a monomer mixture for the hydroxyl group-containing (meth)acrylic copolymer or the hydroxyl group-containing (meth)acrylic copolymer, and the organic nanoparticles.

The silicone-containing (meth)acrylic compound may be present in an amount of about 0.1 parts by weight to about 5 parts by weight, relative to 100 parts by weight of the total weight of a monomer mixture for the hydroxyl group-containing (meth)acrylic copolymer and the organic nanoparticles.

According to one or more embodiments of the present invention, an optical member includes an optical film and the above-described adhesive film stacked on at least one surface of the optical film.

According to one or more embodiments of the present invention, an optical display apparatus includes the above-described adhesive film or the above-described optical member.

DETAILED DESCRIPTION

Some embodiments of the present invention will be described in further detail with reference to the accompanying drawings such that the present invention can be easily implemented by those skilled in the art. It should be understood that the present invention may be embodied in different ways and is not limited to the following embodiments.

Herein, the term "(meth)acryl" refers to acryl and/or methacryl.

Herein, the term "copolymer" may include a prepolymer, an oligomer, a polymer, or a resin.

Herein, the "average particle diameter" of organic nanoparticles refers to a particle diameter thereof, as measured in a water-based or organic solvent using a Zetasizer nano-ZS (Malvern Co., Ltd.) and represented by a Z-average value, and observed by SEM/TEM.

Herein, the term "modulus" means storage modulus (G').

Herein, the term "glass transition temperature (Tg) in a homopolymer phase" may mean a glass transition temperature measured with respect to a homopolymer of a target monomer using a DSC Discovery (TA Instrument Inc.). Specifically, the homopolymer of the target monomer is heated to 180° C. at a heating rate of 20° C./min, slowly cooled to −100° C., and heated to 100° C. at a heating rate of 10° C./min in order to obtain an endothermic transition curve. Then, an inflection point of the endothermic transition curve may be determined as the glass transition temperature.

Herein, an adhesive film according to some embodiments of the present invention will be described.

The adhesive film according to one or more embodiments of the invention (herein, "adhesive film") may have a peel strength ratio of about 50% or more, as calculated by the following Equation 1:

$$\text{Peel strength ratio} = [P3/P1] \times 100, \quad \text{Equation 1}$$

where P1 is peel strength of the adhesive film at 25° C. (unit: gf/inch), and P3 is peel strength of the adhesive film at 25° C. (unit: gf/inch), as measured after 10 cycles of peel strength testing, in which each cycle refers to an operation of leaving the adhesive film at 25° C. for 30 minutes, heating the adhesive film from 25° C. to 80° C. at a heating rate of 5° C./min, leaving the adhesive film at 80° C. for 24 hours, and cooling the adhesive film from 80° C. to 25° C. at a cooling rate of 5° C./min.

In general, rework operation for an adhesive film is performed at high temperature (for example, about 60° C. to about 85° C.). For improvement in reworkability, the adhesive film is desired to have lower peel strength at high temperature than at room temperature. Although rework operation can be performed once, the rework operation may be repeatedly performed for miniaturization, sophistication, and the like.

The adhesive film according to embodiments of the present invention has sufficient peel strength at room temperature to exhibit good adhesion to an adherend and has low peel strength at high temperature to exhibit good reworkability. In addition, the adhesive film allows reversible variation in peel strength even after repeated temperature variation between room temperature and high temperature. With these characteristics, the adhesive film has a high peel strength ratio even after repeated temperature variation between room temperature and high temperature, as compared with initial peel strength at room temperature. Therefore, the adhesive film according to embodiments of the present invention exhibits good reworkability even after repeated temperature variation.

The peel strength ratio of the adhesive film calculated by Equation 1 means a ratio of post-peel strength of the adhesive film to initial peel strength thereof, in which the post-peel strength of the adhesive film is measured after repeated temperature variation between room temperature and high temperature. By satisfying Equation 1, the adhesive film allows reversible variation in peel strength even after repeated temperature variation between room temperature and high temperature, thereby enabling repeated rework operation while securing sufficient peel strength to provide good reliability even after rework operation. In an embodiment, the adhesive film has a peel strength ratio of about 50% to about 100%, for example, about 50%, 55%, 60%, 65%, 70%, 75%, 80%, 85%, 90%, 95%, or 100%, and, in an embodiment, about 80% to about 100%, as calculated by Equation 1.

In an embodiment, the adhesive film may have a peel strength at 25° C., that is, a P1 value, of about 400 gf/inch or more, for example, about 700 gf/inch or more, and, in an embodiment, about 700 gf/inch to about 1200 gf/inch, for example, about 400 gf/inch, 450 gf/inch, 500 gf/inch, 550 gf/inch, 600 gf/inch, 650 gf/inch, 700 gf/inch, 750 gf/inch, 800 gf/inch, 850 gf/inch, 900 gf/inch, 950 gf/inch, 1000 gf/inch, 1050 gf/inch, 1100 gf/inch, 1150 gf/inch, or 1200 gf/inch, in Equation 1. Within this range, the adhesive film can be stably secured to an adherend, for example, a window film, at room temperature, upon adhesive attachment to the adherend.

In an embodiment, the adhesive film may have a peel strength after repeated temperature variation between room temperature and high temperature, that is, a P3 value, of about 560 gf/inch or more, and, in an embodiment, about 600 gf/inch to about 1200 gf/inch, for example, about 560 gf/inch, 600 gf/inch, 650 gf/inch, 700 gf/inch, 750 gf/inch, 800 gf/inch, 850 gf/inch, 900 gf/inch, 950 gf/inch, 1000 gf/inch, 1050 gf/inch, 1100 gf/inch, 1150 gf/inch, or 1200 gf/inch. Within this range, the adhesive film can be used even after repeated rework operation and has high peel strength at room temperature, thereby providing good reliability.

In an embodiment, adhesive film may have a peel strength of about 300 gf/inch or less, for example, about 1 gf/inch, 50 gf/inch, 100 gf/inch, 150 gf/inch, 200 gf/inch, 250 gf/inch, or 300 gf/inch, and, in an embodiment, about 100 gf/inch to about 300 gf/inch, as measured after being left at a high temperature of, for example, 80° C. for 10 minutes. Within this range, the adhesive film can exhibit good reworkability and can satisfy reliability at high temperature or under conditions of high temperature and high humidity.

The adhesive film has good flexural reliability to be applied to a flexible optical display.

In an embodiment, the adhesive film may allow about 100,000 cycles or more of folding without generation of bubbles or cracks at a constant temperature of −20° C. in evaluation of flexural reliability by a method described in Examples described below.

In another embodiment, the adhesive film may allow about 100,000 cycles or more of folding without generation of bubbles or cracks in evaluation of flexural reliability by a method described in the Examples described below, in which each cycle refers to an operation of leaving the adhesive film at −20° C. for 20 minutes, heating the adhesive film from −20° C. to conditions of 60° C. and 93% RH at a heating rate of 5° C./min, leaving the adhesive film under conditions of 60° C. and 93% RH for 20 minutes, and cooling the adhesive film from the conditions of 60° C. and 93% RH to −20° C. at a cooling rate of 5° C./min.

The adhesive film may have a modulus of about 250 kPa or less at −20° C. Within this range, the adhesive film has good flexibility at low temperature, thereby securing good flexural reliability at low temperature. In an embodiment, at −20° C., the adhesive film has a modulus of about 40 kPa to about 200 kPa, for example, about 40 kPa, 45 kPa, 50 kPa, 55 kPa, 60 kPa, 65 kPa, 70 kPa, 75 kPa, 80 kPa, 85 kPa, 90 kPa, 95 kPa, 100 kPa, 105 kPa, 110 kPa, 115 kPa, 120 kPa, 125 kPa, 130 kPa, 135 kPa, 140 kPa, 145 kPa, 150 kPa, 155 kPa, 160 kPa, 165 kPa, 170 kPa, 175 kPa, 180 kPa, 185 kPa, 190 kPa, 195 kPa, or 200 kPa, and, in an embodiment, greater than about 60 kPa to about 180 kPa. If the adhesive film has too low of a temperature modulus, the adhesive film can have too low of a modulus at room temperature/high temperature, thereby causing a problem in recovery performance.

At 60° C., the adhesive film may have a modulus of about 10 kPa to about 50 kPa, for example, 10 kPa, 15 kPa, 20 kPa, 25 kPa, 30 kPa, 35 kPa, 40 kPa, 45 kPa, or 50 kPa, and, in an embodiment, about 15 kPa to about 45 kPa. Within this range, the adhesive film can exhibit good flexural reliability under thermal impact between low temperature and high temperature and under high temperature/humidity conditions.

At 25° C., the adhesive film may have a modulus of about 10 kPa to about 70 kPa, for example, about 10 kPa, 15 kPa, 20 kPa, 25 kPa, 30 kPa, 35 kPa, 40 kPa, 45 kPa, 50 kPa, 55 kPa, 60 kPa, 65 kPa, or 70 kPa, and, in an embodiment, about 20 kPa to about 60 kPa. Within this range, the adhesive film can exhibit good properties in terms of handling properties/processability and flexural reliability at room temperature.

The adhesive film is formed of an adhesive composition including a hydroxyl group-containing (meth)acrylic copolymer and a silicone-containing (meth)acrylic compound, which will be described below in further detail.

In an embodiment, the adhesive film is manufactured by depositing the adhesive composition on a release film, followed by photo-curing. The adhesive film according to the present invention may be manufactured by photo-curing the adhesive composition and allows reversible variation in peel strength even after repeated temperature variation between room temperature and high temperature.

Photo-curing may include irradiation under a low pressure lamp at a wavelength of about 300 nm to about 400 nm and at a dose of about 400 mJ/cm$^2$ to about 3000 mJ/cm$^2$ under an oxygen-free condition. Here, the dose and wavelength for irradiation can be changed depending upon the thickness of the adhesive film and irradiation conditions.

Next, the adhesive composition will be described in further detail.

The adhesive composition includes the hydroxyl group-containing (meth)acrylic copolymer and the silicone-containing (meth)acrylic compound.

The hydroxyl group-containing (meth)acrylic copolymer may form a matrix of the adhesive film and may contribute to providing peel strength of the adhesive film.

The hydroxyl group-containing (meth)acrylic copolymer may be formed of a monomer mixture including a hydroxyl group-containing (meth)acrylate, an alkyl group-containing (meth)acrylate and a hetero-alicyclic group-containing monomer. Here, "hetero-alicyclic group" refers to an alicyclic group containing at least one of nitrogen, oxygen and sulfur, and, in an embodiment, two or more of the same or different elements, in a carbon ring. In an embodiment, the hetero-alicyclic group means a morpholine group.

The hydroxyl group-containing (meth)acrylate can provide adhesive strength to the adhesive film. The hydroxyl group-containing (meth)acrylate may be a substituted or unsubstituted $C_1$ to $C_{10}$ (meth)acrylate containing at least one hydroxyl group. For example, the hydroxyl group-containing (meth)acrylate may include at least one selected from among 2-hydroxybutyl (meth)acrylate, 4-hydroxybutyl (meth)acrylate, 2-hydroxyethyl (meth)acrylate, 2-hydroxypropyl (meth)acrylate, 3-hydroxypropyl (meth)acrylate, and 6-hydroxyhexyl (meth)acrylate. In an embodiment, the hydroxyl group-containing (meth)acrylate may include at least one selected from among 2-hydroxyethyl (meth)acrylate, 2-hydroxypropyl (meth)acrylate, and 3-hydroxybutyl (meth)acrylate. With this composition, the adhesive film can more efficiently realize the effects of the present invention.

The hydroxyl group-containing (meth)acrylate may have a glass transition temperature of about −80° C. to about 0° C., and, in an embodiment, about −70° C. to about −10° C., and, in an embodiment, about −60° C. to about −10° C., in a homopolymer phase thereof. Within this range, the adhesive composition can further improve peel strength and flexural reliability of the adhesive film.

In the monomer mixture, the hydroxyl group-containing (meth)acrylate may be present in an amount of about 5 wt % to about 30 wt % for example, about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, and, in an embodiment, about 5 wt % to about 20 wt %. Within this range, the adhesive composition can assist in achieving reversible variation in peel strength of the adhesive film.

The alkyl group-containing (meth)acrylate can form a matrix of the adhesive film. In an embodiment, the alkyl group-containing (meth)acrylate may include an unsubstituted linear or branched $C_1$ to $C_{10}$ alkyl group-containing (meth)acrylate, or a substituted linear or branched $C_1$ to $C_{10}$ alkyl group-containing (meth)acrylate. For example, the alkyl group-containing (meth)acrylate may include at least one selected from among 2-ethylhexyl (meth)acrylate, n-butyl (meth)acrylate, iso-octyl (meth)acrylate, propyl (meth)acrylate, t-butyl (meth)acrylate, iso-butyl (meth)acrylate, pentyl (meth)acrylate, hexyl (meth)acrylate, heptyl (meth)acrylate, octyl (meth)acrylate, nonyl (meth)acrylate, and decyl (meth)acrylate. In an embodiment, the alkyl group-containing (meth)acrylate is at least one selected from among 2-ethylhexyl (meth)acrylate and iso-octyl (meth)acrylate, more preferably 2-ethylhexyl (meth)acrylate.

The alkyl group-containing (meth)acrylate may have a glass transition temperature of about −80° C. to about −20° C., and, in an embodiment, about −80° C. to about −40° C., in a homopolymer phase thereof. Within this range, the adhesive film can exhibit good flexural reliability at low temperature and under high temperature/humidity conditions.

In the monomer mixture, the alkyl group-containing (meth)acrylate may be present in an amount of about 50 wt % to about 90 wt %, for example, about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %, and, in an embodiment, about 50 wt % to about 85 wt %, and, in an embodiment, about 60 wt % to about 85 wt %. Within this range, the adhesive composition can form an adhesive film that exhibits good flexural reliability at low temperature and under high temperature/humidity conditions.

The hetero-alicyclic group-containing monomer can assist in achieving reversible variation in peel strength of the adhesive film even after repeated temperature variation between room temperature and high temperature. The hetero-alicyclic group-containing monomer may have a glass transition temperature of about 10° C. to about 200° C., in a homopolymer phase thereof, for example, about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C., and, in an embodiment, about 30° C. to about 180° C. Within this range, the adhesive composition can form an adhesive film having good peel strength.

The hetero-alicyclic group-containing monomer may include at least one selected from among N-(meth)acryloylmorpholine and N-(meth)acryloylpyrrolidine. In an embodiment, the hetero-alicyclic group-containing monomer includes N-(meth)acryloylmorpholine and improves peel strength of the adhesive film at room temperature.

In the monomer mixture, the hetero-alicyclic group-containing monomer may be present in an amount of about 1 wt % to about 20 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, and, in an embodiment, about 1 wt % to about 15 wt %, or about 1 wt % to about 10 wt %. Within this range, the adhesive composition can form an adhesive film that exhibits good flexural reliability at low temperature and under high temperature/humidity conditions.

In addition to the hydroxyl group-containing (meth)acrylate, the alkyl group-containing (meth)acrylate, and the hetero-alicyclic group-containing monomer, the monomer mixture may further include a copolymerizable monomer. The copolymerizable monomer included in the monomer mixture or the hydroxyl group-containing (meth)acrylic copolymer can provide additional effects to the adhesive film. The copolymerizable monomer is a different monomer from the aforementioned monomers and may include at least one selected from an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing monomer.

The amine group-containing monomer may be an amine group-containing acrylic monomer, such as any of monomethylaminoethyl acrylate, monoethylaminoethyl acrylate, monomethylaminopropyl acrylate, monoethylaminopropyl acrylate, dimethylaminoethyl acrylate, diethylaminoethyl acrylate, N-tert-butylaminoethyl acrylate, and acryloxyethyltrimethylammonium chloride, without being limited thereto.

The alkoxy group-containing monomer may include any of 2-methoxyethyl acrylate, 2-methoxypropyl acrylate, 2-ethoxypropyl acrylate, 2-butoxypropyl acrylate, 2-methoxypentyl acrylate, 2-ethoxypentyl acrylate, 2-butoxyhexyl acrylate, 3-methoxypentyl acrylate, 3-ethoxypentyl acrylate, and 3-butoxyhexyl acrylate, without being limited thereto.

The phosphoric acid group-containing monomer may be any of a phosphoric acid group-containing acrylic monomer, such as 2-methcryloyloxyethyldiphenylphosphate acrylate, trimethacryloyloxyethylphosphate acrylate, and triacryloyloxyethylphosphate acrylate, without being limited thereto.

The sulfonic acid group-containing monomer may be a sulfonic acid group-containing acrylic monomer, such as any of sulfopropyl acrylate sodium, 2-sulfoethyl acrylate sodium, and 2-acrylamido-2-methylpropane sulfonic acid sodium, without being limited thereto.

The phenyl group-containing monomer may be a phenyl group-containing acrylic vinyl monomer, such as any of p-tert-butylphenyl acrylate, o-biphenyl acrylate, and phenoxyethyl acrylate, without being limited thereto.

The silane group-containing monomer may be a silane group-containing acrylic vinyl monomer, such as any of 2-acetoacetoxyethyl acrylate, vinyltrimethoxysilane, vinyltriethoxysilane, vinyl tris(2-methoxyethyl)silane, vinyltriacetoxysilane, and acryloyloxypropyltrimethoxysilane, without being limited thereto.

The carboxylic acid group-containing monomer may include any of acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group-containing monomer may include any of acrylamide, N-methylacrylamide, N-methylolacrylamide, N-methoxymethylacrylamide, N,N-methylenebisacrylamide, N-hydroxyethylacrylamide, and N,N-diethylacrylamide, without being limited thereto.

The copolymerizable monomer may be present in an amount of about 30 wt % or less, and, in an embodiment, about 0 wt % to about 30 wt %, in the monomer mixture. The copolymerizable monomer may be used to adjust adhesive strength with respect to an adherend and to have optical properties.

In an embodiment, the hydroxyl group-containing (meth) acrylic copolymer may be a non-carboxylic acid-based copolymer, and the monomer mixture may be free from the carboxylic acid group-containing monomer.

In an embodiment, the hydroxyl group-containing (meth) acrylic copolymer or the monomer mixture may be free from an alicyclic group-containing (meth)acrylic monomer. The alicyclic group-containing (meth)acrylic monomer can cause a problem in terms of optical properties, such as an increase in yellow index YI of the adhesive film.

In an embodiment, the hydroxyl group-containing (meth) acrylic copolymer may be a copolymer consisting of the hydroxyl group-containing (meth)acrylate, the alkyl group-containing (meth)acrylate, and the hetero-alicyclic group-containing monomer.

The silicone-containing (meth)acrylic compound contains a (meth)acrylate group as a photo-curing reaction group, through which the silicone-containing (meth)acrylic compound is coupled to the hydroxyl group-containing (meth) acrylic copolymer upon photo-curing reaction. Photo-curing improves flowability of the adhesive film at high temperature and allows silicone-containing moieties of the silicone-containing (meth)acrylic compound to be easily moved towards a surface of the adhesive film, thereby reducing peel strength of the adhesive film at high temperature. In addition, when the adhesive film is cooled to room temperature, the silicone-containing moieties are moved again into the adhesive film to increase the peel strength of the adhesive film, thereby enabling reversible variation in peel strength even after repeated temperature variation between room temperature and high temperature.

In an embodiment, the silicone-containing (meth)acrylic compound is added to the adhesive composition after polymerization of the hydroxyl group-containing (meth) acrylic copolymer instead of being included in a monomer mixture for the hydroxyl group-containing (meth)acrylic copolymer. Through this process, the silicone-containing (meth)acrylic compound allows more efficient realization of the effects of the present invention.

The silicone-containing (meth)acrylic compound may include an organopolysiloxane having at least one (meth) acrylate group at an end thereof. The (meth)acrylate group may be introduced into a side chain, one end, or both ends of the organopolysiloxane, and, in an embodiment, one end or both ends thereof, and, in an embodiment, one end thereof to facilitate movement of the silicone-containing moieties.

The silicone-containing (meth)acrylic compound may include at least one selected from among an organopolysiloxane having a (meth)acrylate group at one end thereof and an organopolysiloxane having (meth)acrylate groups at both ends thereof.

The silicone-containing (meth)acrylic compound may have a functional group equivalent weight of about 4,000 g/mol to about 20,000 g/mol, and, in an embodiment, about 4,000 g/mol to about 15,000 g/mol. Within this range, the silicone-containing (meth)acrylic compound can increase peel strength of the adhesive film at room temperature and can suppress side reaction through photo-curing reaction with the hydroxyl group-containing (meth)acrylic copolymer.

The silicone-containing (meth)acrylic compound may be a liquid at room temperature to facilitate manufacture of the adhesive film while improving transparency of the adhesive film and flowability of the silicone-containing moieties. In an embodiment, the silicone-containing (meth)acrylic compound may have a viscosity of about 50 mm$^2$/s to about 300 mm$^2$/s, and, in an embodiment, about 50 mm$^2$/s to about 250 mm$^2$/s, at 25° C. Within this range, the silicone-containing (meth)acrylic compound can exhibit good compatibility with other components of the adhesive composition.

The silicone-containing (meth)acrylic compound may include a dialkylsiloxane unit or a linear organopolysiloxane compound containing a dialkylsiloxane unit.

In some embodiments, the silicone-containing (meth) acrylic compound may be represented by the following Formula 1 or 2.

Formula 1 where $R_1$, $R_2$, $R_3$, $R_4$, $R_5$, and $R_6$ are each independently a hydrogen atom, a $C_1$ to $C_{10}$ alkyl group, or a $C_6$ to $C_{10}$ aryl group; $R_7$ is a methyl group or a hydrogen atom; X is a methyl group, an ethyl group, a methoxy group, or an ethoxy group; and n is an integer of 100 to 500.

Formula 2 where $R_1$, $R_2$, $R_3$, $R_4$, $R_5$, and $R_6$ are each independently a hydrogen atom, a $C_1$ to $C_{10}$ alkyl group, or a $C_6$ to $C_{10}$ aryl group; $R_7$ and $R_8$ are each independently a methyl group or a hydrogen atom; and n is an integer of 50 to 250.

In an embodiment, in Formula 1 and Formula 2, $R^1$ to $R^6$ are each independently a $C_1$ to $C_5$ alkyl group, for example, a methyl group, an ethyl group, a propyl group, a butyl group, or a pentyl group.

The silicone-containing (meth)acrylic compound may be present in an amount of about 0.1 parts by weight to about 5 parts by weight, for example, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 parts by weight, and, in an embodiment, 0.3 parts by weight to 5 parts by weight, relative to 100 parts by weight of the hydroxyl group-containing (meth)acrylic copolymer or a monomer mixture for the hydroxyl group-containing (meth)acrylic copolymer. Within this range, the adhesive composition can prevent or substantially prevent the silicone-containing (meth)acrylic compound from bleeding out of the adhesive film at high temperature while enabling reversible variation in peel strength upon temperature variation.

In an embodiment, the adhesive composition includes a photoinitiator.

The photoinitiator forms an adhesive film by curing the adhesive composition or to form the hydroxyl group-containing (meth)acrylic copolymer through partial polymerization of the monomer mixture in the adhesive composition.

The photoinitiator may be selected from any initiators so long as the initiator can induce polymerization or curing reaction through generation of radicals in the course of photo curing through irradiation with light. For example, the photoinitiator may be a photo radical initiator and may include any of benzoin, hydroxy ketone, amino ketone, phosphine oxide photoinitiators, and the like. In an embodiment, the photoinitiator may include any of benzoin, benzoin methyl ether, benzoin ethyl ether, benzoin isopropyl ether, benzoin n-butyl ether, benzoin isobutyl ether, acetophenone compounds such as 2,2-dimethoxy-2-phenylacetophenone, 2,2'-diethoxy acetophenone, 2,2'-dibutoxy acetophenone, 2-hydroxy-2-methylpropiophenone, p-t-butyl trichloroacetophenone, p-t-butyl dichloroacetophenone, 4-chloroacetophenone, 2,2'-dichloro-4-phenoxyacetophenone, dimethylaminoacetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexylphenylketone, 2-methyl-1-[4-(methylthio) phenyl]-2-morpholino-propan-1-one, 4-(2-hydroxyethoxy) phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto.

The photoinitiator may be present in an amount of about 0.0001 parts by weight to about 5 parts by weight, and, in an embodiment, about 0.001 parts by weight to about 3 parts by weight, and, in an embodiment, about 0.001 parts by weight to about 1 part by weight, relative to 100 parts by weight of the monomer mixture or the hydroxyl group-containing (meth)acrylic copolymer. Within this range, the initiator allows complete curing of the adhesive composition without bubble generation and deterioration in transmittance of the adhesive film due to residual initiator while exhibiting good reactivity.

In an embodiment, the adhesive composition includes a crosslinking agent.

The crosslinking agent can improve mechanical strength of the adhesive film through improvement in crosslinking degree of the adhesive composition.

The crosslinking agent may include a polyfunctional (meth)acrylate capable of being cured by actinic radiation. For example, the crosslinking agent may include any of bifunctional (meth)acrylates, such as 1,4-butanediol di(meth)acrylate, 1,6-hexanediol di(meth)acrylate, 1,8-octanediol di(meth)acrylate, neopentyl glycol di(meth)acrylate, polyethylene glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol di(meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethyl isocyanurate; tetrafunctional acrylates, such as diglycerin tetra(meth)acrylate and pentaerythritol tetra(meth)acrylate; pentafunctional acrylates, such as dipentaerythritol penta(meth)acrylate; and hexafunctional acrylates, such as dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto.

In an embodiment, the crosslinking agent includes an unsubstituted $C_2$ to $C_{20}$ alkylene group, and, in an embodiment, an unsubstituted $C_4$ to $C_{12}$ alkylene group-containing di(meth)acrylate. With the crosslinking agent, the adhesive composition can improve flexural reliability of the adhesive film. For example, the crosslinking agent may include at least one selected from among 1,4-butanediol di(meth)acrylate, 1,6-hexanediol di(meth)acrylate, and 1,8-octanediol di(meth)acrylate.

The crosslinking agent may be present in an amount of about 0.001 parts by weight to about 5 parts by weight, and, in an embodiment, about 0.003 parts by weight to about 3 parts by weight, and, in an embodiment, about 0.003 parts by weight to about 1 part by weight, relative to 100 parts by weight of the monomer mixture or the hydroxyl group-containing (meth)acrylic copolymer. Within this range, the adhesive film can secure good peel strength and improvement in reliability.

In an embodiment, the adhesive composition further includes organic nanoparticles.

The organic nanoparticles can increase the modulus of the adhesive film at high temperature and can further improve reliability of the adhesive film at high temperature by preventing or substantially preventing delamination, slight lifting, and/or bubble generation at high temperature. The organic nanoparticles have a high glass transition temperature, thereby improving the modulus of the adhesive film at high temperature.

The organic nanoparticles may be optionally present in an amount of about 10 wt % or less, and, in an embodiment, about 0.1 wt % to about 10 wt %, about 0.5 wt % to about 10 wt %, or about 0.5 wt % to about 8 wt %, based on the total weight of a monomer mixture for the hydroxyl group-containing (meth)acrylic copolymer or the hydroxyl group-containing (meth)acrylic copolymer, and the organic nanoparticles. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

The organic nanoparticles may have an average particle diameter of about 10 nm to about 400 nm, and, in an embodiment, about 10 nm to about 300 nm, and, in an embodiment, about 30 nm to about 280 nm, and, in an embodiment, about 50 nm to about 280 nm. Within this range, the organic nanoparticles do not affect foldability of the adhesive film and can secure good transparency of the adhesive film by securing a total light transmittance of about 90% or more in the visible spectrum.

A difference in index of refraction between the organic nanoparticles and the hydroxyl group-containing (meth) acrylic copolymer may be about 0.1 or less, and, in an embodiment, about 0 to about 0.05, and, in an embodiment, about 0 to about 0.02. Within this range, the adhesive film can exhibit good transparency. The organic nanoparticles may have an index of refraction of about 1.35 to about 1.70, and, in an embodiment, about 1.40 to about 1.60. Within this range, the adhesive film can exhibit good transparency.

The organic nanoparticles may have a core-shell structure or a simple structure, such as bead type nanoparticles, without being limited thereto. In an embodiment, for the organic nanoparticles having a core-shell structure, the core and the shell satisfy the following Equation 2. That is, the organic nanoparticles may include nanoparticles in which the core and the shell are formed of organic materials. With the organic nanoparticles having the core-shell structure, the adhesive film can exhibit good foldability and balance between elasticity and flexibility:

$$Tg(c) < Tg(s),\qquad \text{Equation 2}$$

where Tg(c) is the glass transition temperature (unit: ° C.) of the core, and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above equation.

In an embodiment, the core may have a glass transition temperature of about −150° C. to about 10° C., and, in an embodiment, about −150° C. to about −5° C., and, in an embodiment, about −150° C. to about −20° C. Within this range, the adhesive film can have good viscoelasticity at low temperature and/or at room temperature. The core may include at least one selected from among poly(alkyl acrylate), polysiloxane and polybutadiene each having a glass transition temperature within this range.

The poly(alkyl acrylate) may include at least one selected from among poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), and polysiloxane, without being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. In an embodiment, the crosslinked organosiloxane (co)polymer may include crosslinked dimethylsiloxane, methylphenylsiloxane, diphenylsiloxane, and mixtures thereof. With a copolymer of two or more organosiloxanes, the nanoparticles may have an index of refraction of about 1.41 to about 1.50.

A crosslinked state of the organosiloxane (co)polymer may be determined based on the degree of dissolution in various organic solvents. As the degree of crosslinking of the organosiloxane (co)polymer intensifies, the degree of dissolution of the organosiloxane (co)polymer is reduced. A solvent for determination of the crosslinked state may include acetone, toluene, and the like. In an embodiment, the organosiloxane (co)polymer may have a moiety which is not dissolved in acetone or toluene. In an embodiment, the organosiloxane copolymer may include about 30% or more of insolubles in toluene.

The organosiloxane (co)polymer may further include an alkyl acrylate crosslinked polymer. The alkyl acrylate crosslinked polymer may include any of methyl acrylate, ethyl acrylate, n-butyl acrylate, 2-ethylhexyl acrylate, and the like.

For example, the alkyl acrylate crosslinked polymer may be n-butyl acrylate or 2-ethylhexyl acrylate having a low glass transition temperature.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the acrylic copolymer. The shell may include poly(alkyl methacrylate) having a glass transition temperature within this range. For example, the shell may include at least one selected from the group of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In the organic nanoparticles, the core may be present in an amount of about 30 wt % to about 99 wt %, and, in an embodiment, about 40 wt % to about 95 wt %, and, in an embodiment, about 50 wt % to about 90 wt %. Within this range, the adhesive film can exhibit good foldability in a broad temperature range. In the organic nanoparticles, the shell may be present in an amount of about 1 wt % to about 70 wt %, and, in an embodiment, about 5 wt % to about 60 wt %, and, in an embodiment, about 10 wt % to about 50 wt %. Within this range, the adhesive film can exhibit good foldability in a broad temperature range.

The organic nanoparticles may be optionally present in an amount of about 10 wt % or less, for example, about 0 wt %, 0.1 wt %, 0.5 wt %, 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, or 10 wt %, and, in an embodiment, about 0.1 wt % to about 10 wt %, and, in an embodiment, about 0.5 wt % to about 10 wt %, in the adhesive film. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

The organic nanoparticles may be prepared by typical emulsion polymerization, suspension polymerization, or solution polymerization.

In an embodiment, the adhesive composition may include about 5 wt % to about 30 wt % of the hydroxyl group-containing (meth)acrylate, about 50 wt % to about 90 wt % of alkyl group-containing (meth)acrylate, about 1 wt % to about 20 wt % of the hetero-alicyclic group-containing monomer and, optionally, about 10 wt % or less, and, in an embodiment, about 0.1 to about 10 wt %, of the organic nanoparticles, based on the total weight of the mixture for the hydroxyl group-containing (meth)acrylic copolymer and the organic nanoparticles. Within this range, the adhesive film allows reversible variation in peel strength even after repeated temperature variation between room temperature and high temperature and can exhibit good flexural reliability at low temperature and even under thermal impact between low temperature and high temperature.

In an embodiment, relative to 100 parts by weight of the total weight of the monomer mixture for the hydroxyl group-containing (meth)acrylic copolymer and the organic nanoparticles, the photoinitiator may be present in an amount of about 0.001 parts by weight to about 5 parts by weight, the crosslinking agent may be present in an amount of about 0.001 parts by weight to about 5 parts by weight, and the silicone-containing (meth)acrylic compound may be present in an amount of about 0.1 parts by weight to about 5 parts by weight. Within this range, the adhesive film allows reversible variation in peel strength even after repeated temperature variation between room temperature and high temperature and can exhibit good flexural reliability at low temperature and even under thermal impact between low temperature and high temperature.

In an embodiment, the adhesive composition may further include additives.

The additives may be selected from typical additives for adhesive compositions well-known in the art. For example, the additives may include at least one selected from among pigments, UV absorbents, leveling agents, and antistatic agents, without being limited thereto.

The adhesive film may have a haze value of about 2% or less, and, in an embodiment, about 0.1% to about 1%, and a total light transmittance of about 90% or more, and, in an embodiment, about 95% to about 99%, in the visible spectrum (for example, in the wavelength range of 380 nm to 780 nm). Within this range, the adhesive film has good optical transparency and is applicable to an optical display apparatus.

The adhesive film may have a thickness of about 5 μm to about 300 μm, and, in an embodiment, about 8 μm to about 175 μm. Within this thickness range, the adhesive film is applicable to an optical display apparatus.

The adhesive composition may be prepared through partial polymerization of the monomer mixture and the organic nanoparticles with the photoinitiator, followed by adding an additional photoinitiator and the silicone-containing (meth) acrylic compound. The adhesive composition may further include the crosslinking agent and the additives described above. In an embodiment, the adhesive composition may be prepared through partial polymerization of a mixture including the monomer mixture for the hydroxyl group-containing (meth)acrylic copolymer and an initiator, followed by adding an additional photoinitiator and the silicone-containing (meth)acrylic compound. The crosslinking agent and the additives described above may be further added to the mixture. Partial polymerization may include solution polymerization, suspension polymerization, photopolymerization, bulk polymerization, or emulsion polymerization. In an embodiment, solution polymerization may be performed at about 50° C. to about 100° C. by adding an initiator to the monomer mixture. The initiator may include a photopolymerization initiator, such as any of an acetophenone compound including 2,2-dimethoxy-2-phenylacetophenone, 1-hydroxycyclohexylphenylketone, and the like, without being limited thereto. Partial polymerization may be performed to achieve a viscosity of about 300 cP to about 50,000 cP at 25° C., and, in an embodiment, about 500 cP to about 5,000 cP.

An optical member according to one or more embodiments includes an optical film and an adhesive film formed on at least one surface of the optical film, wherein the adhesive film includes the adhesive film according to an embodiment of the present invention. Accordingly, the optical member exhibits good flexural reliability and can secure good reworkability in repeated rework operation from an adherend.

In an embodiment, the optical film provides optical functions, for example, polarization, optical compensation, display quality improvement, and/or conductivity, to a display. Examples of the optical film may include a window film, a window, a polarizing plate, a color filter, a retardation film, an elliptical polarizing film, a reflective polarizing film, an anti-reflection film, a compensation film, a brightness improving film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like. These optical films may be easily manufactured by a person having ordinary knowledge in the art.

In an embodiment, the optical film is an optically clear film, and an optical member including the optical film and the adhesive film may act as a support layer for a display element. For example, the display element may include a window film and the like. The window film may include the optical member and a window coating layer (for example: a silicone coating layer) formed on the optical member. In an embodiment, the optical film may have a total light transmittance of 90% or more in the visible spectrum and may be formed of at least one resin selected from among cellulose resins such as triacetylcellulose, polyester resins such as polyethylene terephthalate, polyethylene naphthalate, polybutylene terephthalate and polybutylene naphthalate, polycarbonate resins, polyimide resins, polystyrene resins, polyacrylate resins such as poly(methyl methacrylate), cyclic olefin polymer resins, acrylic resins, and polyamide resins. The optical film may have a thickness of about 10 μm to about 100 μm, and, in an embodiment, about 20 μm to about 75 μm, and, in an embodiment, about 30 μm to about 50 μm. Within this range, the optical member can be used as the support layer for the display element.

In an embodiment, the optical film includes a window film.

An optical display apparatus according to one or more embodiments of the present invention includes the adhesive film according to an embodiment of the present invention.

The optical display apparatus may include any of an organic light emitting diode display, a liquid crystal display, and the like. In an embodiment, the optical display apparatus may include a flexible display. In other embodiments, the optical display apparatus may include a non-flexible display.

Next, the present invention will be described in further detail with reference to some examples. However, it is to be understood that these examples are provided for illustration and should not be construed in any way as limiting the invention.

Example 1

Organic nanoparticles were prepared by emulsion polymerization. The core was formed of poly(butyl acrylate) and the shell was formed of poly(methyl methacrylate). In the organic nanoparticles, the shell was present in an amount of 35 wt % and the core was present in an amount of 65 wt %. The organic nanoparticles satisfied Equation 2 and had an average particle diameter of 100 nm and an index of refraction of 1.48.

100 parts by weight of a mixture of the prepared organic nanoparticles and a monomer mixture, as listed in Table 1, and 0.5 parts by weight of a photoinitiator (Omnirad 651, 2,2-dimethoxy-2-phenylacetophenone, IGM) were sufficiently mixed in a reactor. After replacing dissolved oxygen in the reactor with nitrogen gas, the monomer mixture was subjected to partial polymerization through irradiation with UV light for several minutes under a low-pressure mercury lamp, thereby preparing a viscous liquid having a viscosity of 500 cP to 5,000 cP at 25° C. The viscous liquid may include a hydroxyl group-containing (meth)acrylic partial copolymer obtained by partial polymerization of some of the monomer mixture, non-polymerized monomers, and the organic nanoparticles. In the viscous liquid, the hydroxyl group-containing (meth)acrylic partial copolymer was present in an amount of 5 wt % to 15 wt %.

X-22-2426 as silicone-containing (meth)acrylic compound and HDDA as crosslinking agent were added to the prepared viscous liquid as listed in Table 1 and mixed to prepare an adhesive composition, which in turn was subjected to removal of bubbles. Then, the adhesive composition was coated onto a polyethylene terephthalate (PET) release film (thickness: 75 µm) to form a coating layer, and a polyethylene terephthalate (PET) film (thickness: 75 µm) was stacked on the coating layer, followed by irradiation with UV light at a dose of 2,000 mJ/cm$^2$, thereby preparing an adhesive sheet of PET film (thickness: 75 µm)/adhesive film (thickness: 25 µm)/PET film (thickness: 75 µm).

In Table 1, each of the components of the adhesive composition is represented in parts by weight, and "–" means that the corresponding component is not present.

Examples 2 to 7

Each adhesive sheet of PET film/adhesive film/PET film was fabricated in the same manner as in Example 1 except that the components of the adhesive composition were changed as listed in Table 1.

Comparative Examples 1 to 5

Each adhesive sheet of PET film/adhesive film/PET film was fabricated in the same manner as in Example 1 except that the components of the adhesive composition were changed as listed in Table 1.

The adhesive films were removed from the PET films of the adhesive sheets manufactured in the Examples and Comparative Examples and were evaluated as to the following properties as listed in Table 1, and evaluation results are shown in Table 1.

(1) Peel strength P1 (unit: gf/in): A specimen for measurement of peel strength of an adhesive film is shown in FIGS. 1A and 1B, which show a top view and a cross-sectional view, respectively, of the specimen for measurement of peel strength.

Figure 1A:
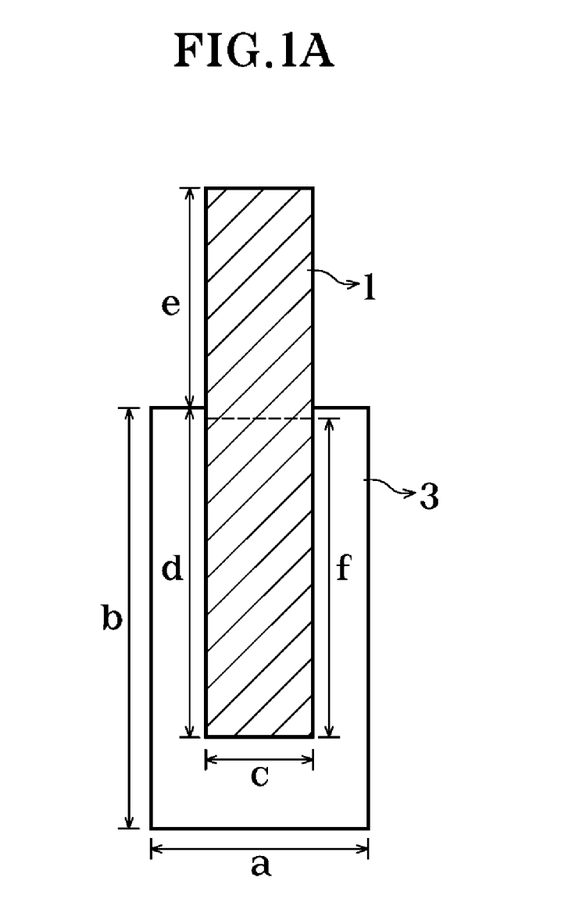
FIGS. 1A and 1B are a top view and a cross-sectional view, respectively, of a specimen for measurement of peel strength.
Figure 1B:
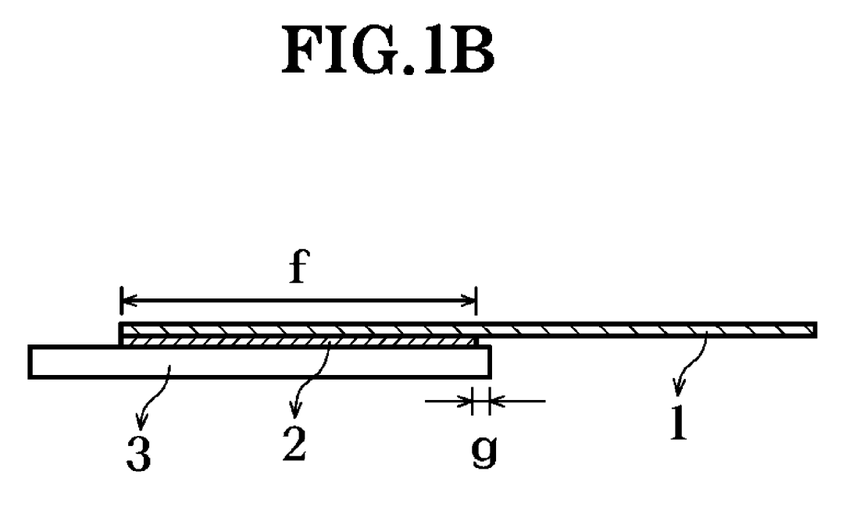

Referring to FIGS. 1A and 1B, an adhesive film 2 of each of the Examples and Comparative Examples and a PET film 1 subjected to treatment twice (total dose: 156 doses) while plasma discharging at 78 doses using a corona treatment device were sequentially stacked on a high-strength glass plate 3. In FIGS. 1A and 1B, "a" is 50 mm, "b" is 100 mm, "c" is 25 mm, "d" is 70 mm, "e" is 50 mm, "f" is 60 mm, and "g" is 10 mm. The adhesive film 2 had a thickness of 25 µm and the PET film 1 had a thickness of 75 µm.

The specimen as shown in FIGS. 1A and 1B was prepared and left at 25° C. for 30 minutes. The specimen was secured to TA.XT_Plus Texture Analyzer (Stable Micro Systems).

Figure 2:
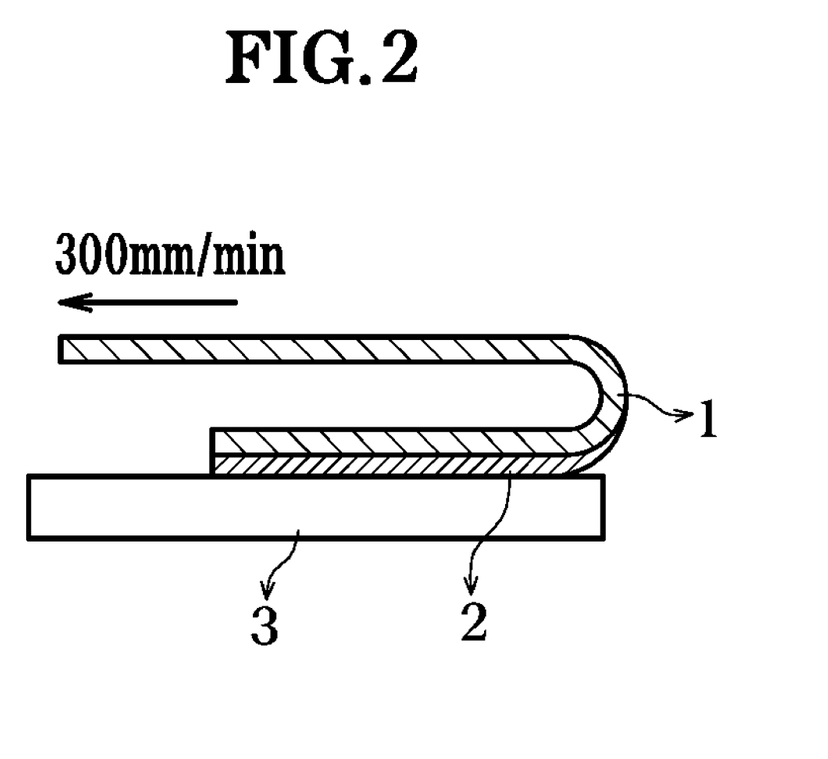
FIG. 2 is a cross-sectional view of a specimen for measurement of peel strength.

Peel strength of the specimen was measured at 25° C. by a method shown in FIG. 2. FIG. 2 is a cross-sectional view of a specimen for measurement of peel strength.

Referring to FIG. 2, a portion of the PET film 1 not attached to the adhesive film 2 was bent at a peeling angle of 180 degrees and one end of the PET film 1 was pulled at a speed of 300 mm/min using the TA.XT_Plus Texture Analyzer to measure peel strength at which the adhesive film 2 was peeled off the high-strength glass plate 3.

(2) Peel strength P2 (unit: gf/inch): An adhesive film was left at 80° C. for 10 minutes. Thereafter, a specimen was prepared using the adhesive film in the same manner as in (1). Peel strength was measured at 25° C. in the same manner as in (1).

(3) Peel strength P3 (unit: gf/inch): An adhesive film was subjected to 10 cycles of peel strength testing, in which each cycle refers to an operation of leaving the adhesive film at 25° C. for 30 minutes, heating the adhesive film from 25° C. to 80° C. at a heating rate of 5° C./min, leaving the adhesive film at 80° C. for 24 hours, and cooling the adhesive film from 80° C. to 25° C. at a cooling rate of 5° C./min. Thereafter, a specimen was prepared using the adhesive film in the same manner as in (1). Peel strength was measured at 25° C. in the same manner as in (1).

(4) Modulus (unit: kPa): Viscoelasticity was measured under auto-strain conditions at a shear rate of 1 rad/sec and a strain of 1% using a rheometer (ARES G2, TA Instrument Inc.) as a dynamic viscoelasticity instrument. Plural adhesive films prepared in each of the Examples and Comparative Examples were stacked to a thickness of 800 µm. The stack was punched by an 8 mm diameter punching machine, thereby preparing a specimen. With a normal force of 1.0 N applied to the specimen using an 8 mm jig, modulus was measured at –20° C. and at 60° C. while increasing temperature from –60° C. to 90° C. at a rate of 5° C./min.

(5) Flexural reliability (at low temperature): A module sample was fabricated by sequentially stacking a window film, an adhesive film, a polarizer, an adhesive film, and an OLED panel. The window film, the adhesive film, the polarizer, the adhesive film, and the OLED panel used in fabrication of the module sample were as follows.

Window film: A PET film (thickness: 100 µm, Cosmoshine TA015, Toyobo Co., Ltd.) was used.

Adhesive film: The adhesive films (thickness: 50 µm) prepared in the Examples and Comparative Examples were used.

Polarizer: A PVA resin dyed with iodine was used. An 80 µm thick polyvinyl alcohol film (degree of saponification: 99.5, degree of polymerization: 2,000) was dipped and dyed in a 0.3% iodine solution and stretched to a length of 5.0 times an initial length thereof in the MD. Then, the stretched polyvinyl alcohol film was dipped in a 3% boric acid solution and a 2% potassium iodide solution for color correction, followed by drying the polyvinyl alcohol film at 50° C. for 4 minutes, thereby providing a polarizer (thickness: 23 µm).

OLED panel: A PET film (thickness: 100 µm, Cosmoshine TA015, Toyobo Co., Ltd.) was used.

The fabricated module sample was cut into a specimen having a size of 170 mm×110 mm and subjected to 100,000 cycles of folding at –20° C. to evaluate generation of bubbles, cracks, and delamination. The specimen was subjected to the folding test in the longitudinal direction of the specimen and in the direction of the OLED panel such that a bent portion of the specimen had a radius of curvature of 1.5 mm at a folding rate of 30 cycles per minute (here, 1 cycle refers to an operation of folding the specimen to have the radius of curvature, followed by unfolding the specimen back to an original state thereof). Generation of no bubbles, cracks, and delamination was evaluated as "OK" and generation of at least one of bubbles, cracks and delamination was evaluated as "NG."

(6) Flexural reliability (@ acceleration lifespan): A module sample was fabricated by the same method as in (5). The sample was evaluated by the folding test in the same manner as in (5). The sample was subjected to 100,000 cycles of folding, in which each cycle refers to an operation of leaving the adhesive film at –20° C. for 20 minutes, heating the adhesive film from −20° C. to conditions of 60° C. and 93% RH at a heating rate of 5° C./min, leaving the adhesive film under conditions of 60° C. and 93% RH for 20 minutes, and cooling the adhesive film from the conditions of 60° C. and 93% RH to −20° C. at a cooling rate of 5° C./min. Flexural reliability was evaluated using the same method as in (5).

(7) Reworkability at high temperature: An adhesive film was cut into a specimen having a size of 100 mm×100 mm and attached to a high-strength glass plate to prepare a specimen. The specimen was placed on a hot plate and left at 80° C. for 10 minutes, followed by peeling the adhesive film from the high-strength glass plate at a speed of 2400 mm/min. Failure of the adhesive film was determined depending upon the presence of the adhesive film residue on the high-strength glass plate. The absence of the adhesive film residue on the high-strength glass plate indicating no failure of the adhesive film was evaluated as "OK" and the presence of the adhesive film residue on the high-strength glass plate indicating failure of the adhesive film was evaluated as "NG."

secure good protection for an adherend. The adhesive films according to the present invention had lower peel strength at high temperature than at room temperature, thereby improving reworkability. The adhesive films according to the present invention suppressed reduction in peel strength after repeated temperature variation in the sequence of room temperature, high temperature, room temperature, and high temperature, as compared with initial peel strength at room temperature. The adhesive films according to the present invention exhibited good reworkability even after repeated temperature variation. Conversely, the adhesive films of the Comparative Examples failed to obtain the effects of the present invention.

It should be understood that various modifications, changes, alterations, and equivalent embodiments can be made by those skilled in the art without departing from the spirit and scope of the present invention.

What is claimed is:

1. An adhesive film formed of an adhesive composition comprising a hydroxyl group-containing (meth)acrylic

TABLE 1

|  |  | Example | | | | | | | Comparative Example | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| Monomer | 2-EHA | 82 | 83 | 82 | 82 | 82 | 82 | 82 | 82 | 82 | 82 | 82 | 82 |
| mixture | 2-HEA | 10 | 10 | 10 | 10 | 10 | 10 | 10 | 10 | 10 | 10 | 10 | 10 |
|  | ACMO | 7 | 7 | 7 | 7 | 7 | 7 | 7 | 7 | 7 | 7 | 7 | 7 |
| Organic nanoparticles | | 1 | — | 1 | 1 | 1 | 1 | 1 | 1 | 1 | 1 | 1 | 1 |
| Omnirad 651 | | 0.5 | 0.5 | 0.5 | 0.5 | 0.5 | 0.5 | 0.5 | 0.5 | 0.5 | 0.5 | 0.5 | 0.5 |
| HDDA | | 0.1 | 0.1 | 0.1 | 0.3 | 0.3 | 0.3 | 0.3 | 0.3 | 0.3 | 0.3 | 0.3 | 0.3 |
| X-22-2426 | | 0.5 | 0.5 | 1.0 | — | — | — | — | — | 10 | — | — | — |
| KF-2012 | | — | — | — | 0.5 | 1.0 | 2 | 4 | — | — | 10 | — | — |
| KP-611 | | — | — | — | — | — | — | — | — | — | — | 0.5 | 5 |
| Thickness of adhesive film | | 25 | 25 | 25 | 25 | 25 | 25 | 25 | 25 | 25 | 25 | 25 | 25 |
| Peel | P1 | 810 | 730 | 770 | 854 | 794 | 735 | 721 | 894 | 470 | 489 | 690 | 354 |
| strength | P2 | 242 | 208 | 211 | 243 | 221 | 198 | 198 | 439 | 98 | 89 | 151 | 54 |
|  | P3 | 785 | 685 | 737 | 843 | 759 | 680 | 654 | 930 | 228 | 232 | 177 | 74 |
| Value of Equation 1 | | 97 | 94 | 96 | 99 | 96 | 93 | 91 | 104 | 49 | 47 | 26 | 21 |
| Modulus | @−20° C. | 150 | 148 | 155 | 145 | 154 | 171 | 189 | 153 | 270 | 310 | 210 | 210 |
|  | @60° C. | 33 | 29 | 38 | 23 | 24 | 26 | 30 | 31 | 29 | 29 | 24 | 12 |
| Flexural reliability | Low temperature | OK | OK | OK | OK | OK | OK | OK | OK | NG | NG | OK | NG |
|  | Acceleration lifespan | OK | OK | OK | OK | OK | OK | OK | OK | NG | NG | NG | NG |
| Reworkability at high temperature | | OK | OK | OK | OK | OK | OK | OK | NG | OK | OK | OK | OK |

* 2-EHA: 2-ethylhexyl acrylate (LG Chemical, Tg in homopolymer phase: −64.5° C.)
* 2-HEA: 2-hydroxyethyl acrylate (Osaka Organic Chemical Industry Ltd., Tg in homopolymer phase: −15° C.)
* ACMO: Acryloylmorpholine (KJ Chemicals Corporation, Tg in homopolymer phase: 145° C.)
* HDDA: 1,6-hexanediol diacrylate
* X-22-2426: Polydimethylsiloxane having (meth)acrylate groups at both ends (Shin-Etsu Chemical Co., Ltd.)
* KF-2012: Polydimethylsiloxane having a (meth)acrylate group at one end (Shin-Etsu Chemical Co., Ltd.)
* KP-611: Polydimethylsiloxane free from a (meth)acrylate group (Shin-etsu Chemical Co., Ltd.)

As shown in Table 1, the adhesive films according to the present invention had sufficient peel strength at room temperature to secure good protection for an adherend and had lower peel strength at high temperature than at room temperature, thereby improving reworkability. Further, the adhesive films according to the present invention allowed reversible variation in peel strength even after repeated temperature variation in the sequence of room temperature, high temperature, room temperature, and high temperature, thereby minimizing or reducing a reduction in peel strength even after repeated temperature variation from high temperature to room temperature, as compared with peel strength at initial room temperature, while exhibiting good repeated reworkability at high temperature.

As such, the adhesive films according to the present invention had sufficient peel strength at room temperature to copolymer and a silicone-containing (meth)acrylic compound, the adhesive film having a peel strength ratio of about 50% or more with respect to a glass substrate, as calculated by the following Equation 1:

peel strength ratio=[P3/P1]×100, where P1 is a peel strength of the adhesive film at 25° C. (unit: gf/inch), and P3 is a peel strength of the adhesive film at 25° C. (unit: gf/inch), as measured after 10 cycles of peel strength testing, in which each cycle refers to an operation of leaving the adhesive film at 25° C. for 30 minutes, heating the adhesive film from 25° C. to 80° C. at a heating rate of 5° C./min, leaving the adhesive film at 80° C. for 24 hours, and cooling the adhesive film from 80° C. to 25° C. at a cooling rate of 5° C./min, wherein the adhesive film has a P1 value of about 400 gf/inch or more in Equation 1, and wherein the silicone-containing (meth)acrylic compound is present in an amount of about 0.1 parts by weight to about 5 parts by weight, relative to 100 parts by weight of the hydroxyl group-containing (meth)acrylic copolymer or a monomer mixture for the hydroxyl group-containing (meth)acrylic copolymer.

2. The adhesive film according to claim 1, wherein the adhesive film has a P3 value of about 560 gf/inch or more in Equation 1.

3. An optical member comprising:
an optical film; and
an adhesive film formed on at least one surface of the optical film, the adhesive film comprising the adhesive film according to claim 2.

4. An optical display apparatus comprising the optical member according to claim 3.

5. An optical member comprising:
an optical film; and
an adhesive film formed on at least one surface of the optical film, the adhesive film comprising the adhesive film according to claim 1.

6. An optical display apparatus comprising the optical member according to claim 5.

7. The adhesive film according to claim 1, wherein the hydroxyl group-containing (meth)acrylic copolymer comprises a copolymer of a monomer mixture comprising a hydroxyl group-containing (meth)acrylate, an alkyl group-containing (meth)acrylate, and a hetero-alicyclic group-containing monomer.

8. The adhesive film according to claim 7, wherein the monomer mixture comprises about 5 wt % to about 30 wt % of the hydroxyl group-containing (meth)acrylate, about 50 wt % to about 90 wt % of the alkyl group-containing (meth)acrylate, and about 1 wt % to about 20 wt % of the hetero-alicyclic group-containing monomer.

9. The adhesive film according to claim 7, wherein the hetero-alicyclic group-containing monomer comprises N-(meth)acryloylmorpholine.

10. The adhesive film according to claim 1, wherein the silicone-containing (meth)acrylic compound is present in an amount of about 0.3 parts by weight to about 5 parts by weight, relative to 100 parts by weight of the hydroxyl group-containing (meth)acrylic copolymer or the monomer mixture for the hydroxyl group-containing (meth)acrylic copolymer.

11. The adhesive film according to claim 1, wherein the silicone-containing (meth)acrylic compound comprises at least one selected from among an organopolysiloxane having a (meth)acrylate group at one end thereof and an organopolysiloxane having (meth)acrylate groups at both ends thereof.

12. The adhesive film according to claim 1, wherein the adhesive composition further comprises a crosslinking agent and a photoinitiator.

13. The adhesive film according to claim 12, wherein the crosslinking agent comprises a photocurable polyfunctional (meth)acrylate.

14. The adhesive film according to claim 1, wherein the adhesive composition further comprises organic nanoparticles.

15. The adhesive film according to claim 14, wherein the organic nanoparticles comprise core-shell nanoparticles satisfying the following Equation 2:

$$Tg(c) < Tg(s),$$

where $Tg(c)$ is a glass transition temperature of the core (unit: °C.), and $Tg(s)$ is a glass transition temperature of the shell (unit: °C.).

16. The adhesive film according to claim 14, wherein the organic nanoparticles are present in an amount of about 0.1 wt % to about 10 wt %, based on the total weight of a monomer mixture for the hydroxyl group-containing (meth)acrylic copolymer or the hydroxyl group-containing (meth)acrylic copolymer, and the organic nanoparticles.

17. An adhesive film formed of an adhesive composition comprising a hydroxyl group-containing (meth)acrylic copolymer and a silicone-containing (meth)acrylic compound, the adhesive film having a peel strength ratio of about 50% or more with respect to a glass substrate, as calculated by the following Equation 1:

$$\text{peel strength ratio} = [P3/P1] \times 100,$$

where P1 is a peel strength of the adhesive film at 25° C. (unit: gf/inch), and P3 is a peel strength of the adhesive film at 25° C. (unit: gf/inch), as measured after 10 cycles of peel strength testing, in which each cycle refers to an operation of leaving the adhesive film at 25° C. for 30 minutes, heating the adhesive film from 25° C. to 80° C. at a heating rate of 5° C./min, leaving the adhesive film at 80° C. for 24 hours, and cooling the adhesive film from 80° C. to 25° C. at a cooling rate of 5° C./min, wherein the adhesive film has a P1 value of about 400 gf/inch or more in Equation 1, wherein the adhesive composition further comprises organic nanoparticles, and wherein the silicone-containing (meth)acrylic compound is present in an amount of about 0.1 parts by weight to about 5 parts by weight relative to 100 parts by weight of the total weight of a monomer mixture for the hydroxyl group-containing (meth)acrylic copolymer and the organic nanoparticles.

18. An optical member comprising:
an optical film; and
an adhesive film formed on at least one surface of the optical film, the adhesive film comprising the adhesive film according to claim 17.

19. An optical display apparatus comprising the optical member according to claim 18.

* * * * *